United States Patent
Oroskar et al.

(10) Patent No.: US 11,064,414 B1
(45) Date of Patent: Jul. 13, 2021

(54) HANDOVER TARGET SELECTION BASED ON LATENCY

(71) Applicant: Sprint Spectrum LP, Overland Park, KS (US)

(72) Inventors: Siddharth Oroskar, Overland Park, KS (US); Jasinder Singh, Olathe, KS (US); Rajil Malhotra, Olathe, KS (US); Nitesh Manchanda, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 709 days.

(21) Appl. No.: 15/017,849

(22) Filed: Feb. 8, 2016

(51) Int. Cl.
*H04W 36/30* (2009.01)
*H04B 17/318* (2015.01)
*H04W 36/00* (2009.01)

(52) U.S. Cl.
CPC .......... *H04W 36/30* (2013.01); *H04B 17/318* (2015.01); *H04W 36/0088* (2013.01)

(58) Field of Classification Search
CPC . H04W 36/0083; H04W 36/30; H04W 48/18; H04W 28/0236; H04W 36/0016; H04W 48/02
USPC ........................... 455/435.2, 435.3, 436–444
See application file for complete search history.

(56) References Cited

U.S. PATENT DOCUMENTS

| | | | |
|---|---|---|---|
| 8,559,957 B2 | 10/2013 | Hunzinger | |
| 2009/0047958 A1* | 2/2009 | Rimhagen | H04J 11/0093 455/436 |
| 2009/0132675 A1* | 5/2009 | Horn | H04W 8/26 709/207 |
| 2009/0275334 A1* | 11/2009 | Xie | H04W 36/04 455/436 |
| 2011/0183675 A1* | 7/2011 | Bae | H04W 36/04 455/436 |
| 2012/0051321 A1* | 3/2012 | De | H04W 36/0011 370/331 |
| 2012/0322446 A1* | 12/2012 | Ramachandran | H04W 48/18 455/436 |
| 2013/0083744 A1* | 4/2013 | Peng | H04W 52/04 370/329 |
| 2014/0092777 A1* | 4/2014 | Liu | H04W 48/16 370/254 |
| 2014/0369318 A1 | 12/2014 | Adjakple et al. | |
| 2015/0327133 A1* | 11/2015 | Yiu | H04W 48/20 455/436 |

(Continued)

*Primary Examiner* — Lester G Kincaid
*Assistant Examiner* — Dung L Lam (57) ABSTRACT

Upon satisfying a first handover condition based on signal measurements, an identity of the one or more target access nodes is determined, the identity being associated with a latency, and a determination is made whether or not to execute the handover based on at least the identifier or the latency of the one or more target access nodes. As macrocell access nodes are known to have smaller latency than small access nodes, the macrocell access node is a preferred target, regardless of signal measurements of the small access node. In embodiments, the type or latency of the target access node is weighted higher than the signal measurement for the determination of a preferred target access node. Target access nodes may be assigned priorities based on their type, latency, and signal measurements, and highest-prioritized target access nodes may be preferred as handover targets.

19 Claims, 4 Drawing Sheets

(56) References Cited

U.S. PATENT DOCUMENTS

2016/0088529 A1\* 3/2016 Yoon .................... H04W 48/18
　　　　　　　　　　　　　　　　　　　　　　　　455/436
2016/0242111 A1\* 8/2016 Wakabayashi .......... H04W 4/70

\* cited by examiner

HANDOVER TARGET SELECTION BASED ON LATENCY

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes (or "mini-macros") that function as a relay node for relaying communication from a macro base station or eNodeB, that functions as a donor access node, to an end-user wireless device. Relay nodes may be used at the edge of a coverage area of a donor access node to improve coverage and/or service, as well as in crowded areas having a high number of other wireless devices to increase the available throughput to the end-user wireless devices being relayed.

However, usage of relay nodes can add latency to communications between the end-user wireless devices and the network. Although the additional latency is small (~20 ms), such additional latency may be unacceptable to a user running an application on the end-user wireless device that is sensitive to latency, such as voice over IP (VoIP), or gaming. A handover to a relay node while operating such a latency-sensitive application can result in lower quality of service (QoS) for the end-user wireless device, even though the signal strength or any other signal characteristic of the relay node would otherwise be sufficient to trigger the handover.

OVERVIEW

Exemplary embodiments described herein include systems, methods, and processing nodes for performing handovers of end-user wireless devices based at least on a latency of the target access node. A method for performing handovers includes receiving one or more signal measurements from an end-user wireless device. The one or more signal measurements include an identifier for each target access node of one or more target access nodes associated with the one or more signal measurements. The method further includes determining a priority for said each target access node based in part on the identifier and a signal measurement of said each target access node, and initiating a handover of the end-user wireless device to a highest-prioritized target access node.

A system for performing handovers includes a first access node for providing network services to an end-user wireless device and a processor communicatively coupled to the first access node. The processor configures the first access node to execute operations including receiving one or more signal measurements from the end-user wireless device. The one or more signal measurements include an identifier for each access node of one or more target access nodes associated with the one or more signal measurements. Upon determining, based on the identifier, that at least one target access node from the one or more target access nodes is a preferred target access node type, the first access node overrides the one or more signal measurements and initiating a handover of the end-user wireless device to the at least one target access node. The preferred target access node is one that offers a lowest-possible latency for an application running on the end-user wireless.

A processing node for performing handovers includes a processor that enables the processing node to perform operations comprising receiving a signal measurement and an identifier of a target access node from an end-user wireless device attempting a handover. The signal measurement is measured at the end-user wireless device. Upon the signal measurement exceeding a serving signal level by less than a threshold amount, the processing node overrides the signal measurement and performs the handover based on the identifier of the target access node. The identifier of the target access node indicates that the target access node is a low-latency access node.

DETAILED DESCRIPTION

In embodiments disclosed herein, upon satisfying a first handover condition based on signal measurements of one or more target access nodes received from an end-user wireless device, an identifier of the one or more target access nodes is determined, the identifier being associated with a latency of the one or more target access nodes, and a determination is made whether or not to execute the handover based on at least the identifier or the latency of the one or more target access nodes. For example, the identifier of the target access node may include an access node type, such as a macrocell access node, or a small access node. As macrocell access nodes are known to have smaller latency than small access nodes by virtue of being directly connected to the core network, the macrocell access node may be a preferred target, even though the signal measurement of the small access node is greater. Thus, the type or latency of the target access node is weighted higher than the signal measurement for the determination of a preferred target access node. Target access nodes may be assigned priorities based on their type, latency, and signal measurements, and highest-prioritized target access nodes may be preferred as handover targets.

In some embodiments, the signal measurement of a high-latency access node, such as a small access node, is completely disregarded unless it exceeds a threshold amount. For instance, if the signal measurement that triggered the handover initiation is a positive indicator such as a reference signal receive power (RSRP) or a reference signal receive quality (RSRQ), it must be at least a threshold amount greater than the corresponding RSRP/RSRQ of a low-latency (or macrocell) target access node for the small access node to be considered as a preferred target or assigned a priority. Similarly, if the signal measurement that triggered the handover initiation is a negative indicator, such as a congestion or noise indicator, it must be at least a threshold amount less than the corresponding congestion/noise indicator of a low-latency target access node for the small access node to be considered as a preferred target.

Additional factors may be used to determine when a low-latency access node is a preferred target. An application type running on the end-user wireless device at the time of receiving the signal measurements may be considered during the handover decision. If the application type corresponds to a latency-sensitive application such as VoIP or gaming, then the low-latency access node is automatically preferred or assigned a higher priority, and the signal levels discarded or subject to minimum or maximum thresholds identified herein. Further, a mobility or handover frequency of the end-user wireless device may affect the target access node prioritization. If the end-user wireless device has a high mobility, a macrocell access node may be determined to have a higher priority than a small access node, by virtue of the macrocell access node having a larger coverage area, thereby being subject to fewer handovers. The mobility of the end-user wireless device may be based on a time period between handovers, or a frequency of handovers over a fixed time period.

These and additional operations are further described with respect to the embodiments depicted in FIGS. 1-9 below.

Figure 1:
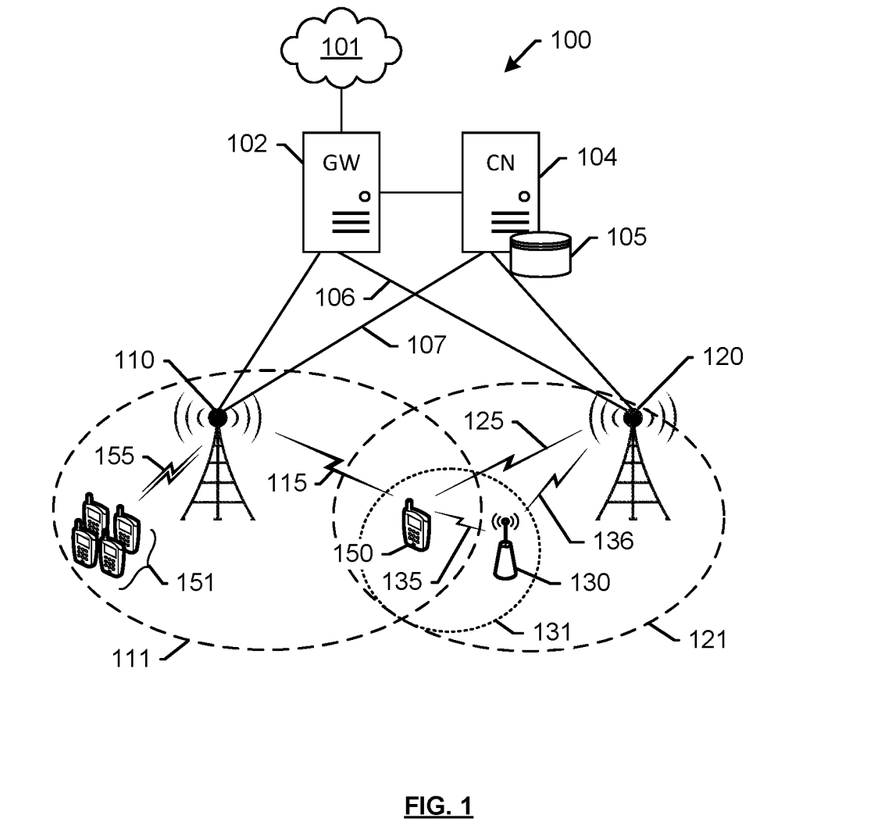
FIG. 1 depicts an exemplary system for performing handovers.

FIG. 1 depicts an exemplary system 100 for donor selection. System 100 comprises a communication network 101, gateway 102, controller node 104, access nodes 110 and 120, relay node 130, and end-user wireless devices 150, 151. Access node 110 is illustrated as having coverage area 111, and access node 120 is illustrated as having coverage area 121. End-user wireless devices 151 are located within coverage area 111 and access network services directly from access node 110 via air interface(s) 155. End-user wireless device 150 is located within all three coverage areas 111, 121, 131, and is able to access network services from either access node 110 via air interface 115, from access node 120 via air interface 125, or from relay access node 130 (relayed from access node 120) via air interface 135. Relay access node 130 is located within coverage area 121, and is illustrated as having its own coverage area 131. Relay access node 130 can act as a wireless access point for end-user wireless device 150, relaying services to end-user wireless device 150 from access node 120 via air interface 136, also referred to herein as a relay backhaul air interface, or simply "backhaul". Consequently, access node 120 may be referred to as a donor access node. In embodiments described herein, backhaul 136 adds latency of up to 20 ms, which may be undesirable for latency-sensitive applications running on end-user wireless device 150, such as VoIP applications. Therefore, if end-user wireless device 150 requests a handover and includes signal measurements of relay access node 130 and one or both of access nodes 110, 120, a handover determination operation may disregard the signal measurements and instead select one of access nodes 110, 120 as a preferred access node, based on the identifier, type, and/or latency of access nodes 110, 120.

More specifically, end-user wireless device 150 may determine that, based on signal measurements of reference signals measured at end-user wireless device 150, relay access node 130 has the best signal measurement. Thus, a first handover condition (based solely on signal measurements) is satisfied, and the end-user wireless device 150 transmits signal measurements of all received signals to a serving access node requesting a handover determination. In this exemplary embodiment, the serving access node can be any one of access nodes 110 or 120, and although the embodiment will be described with access node 110 being the serving access node and access nodes 120, 130 being target access nodes for a handover, other combinations are possible. In either case, the signal measurements of reference signals measured at end-user wireless device 150 and transmitted to access node 110 can further include information about an identity of each target access node 120, 130, enabling access node 110 to perform a determination of which target access node among 120, 130 is a preferred target access node for the handover, based on numerous factors described herein, including at least the identifier, type, or latency of target access nodes 120, 130.

For instance, the measurement includes a measurement of signals 125, 135, as well as an identifier of the corresponding access node 120, 130, respectively. The identifier can include a unique physical cell identifier (PCI) of each access node 120, 130, or of a specific cell deployed therefrom. For instance, depending on the type of node, an access node can deploy more than one cell, each of which has a unique PCI. Therefore, access node 110 is able to determine an identity of each access node 120, 130 that generated the measured reference signal 125, 135 using the respective PCI. The measurement may include an access node type, such as a macrocell access node, or a small access node. Alternatively or in addition, the identifier of the target access node may be associated with the access node type based on, for example, a comparison with a table stored on access node 110. In either case, a macrocell access node such as access node 120 is associated with a smaller latency than a small access nodes such as relay node 130, by virtue of being connected to core network 101 via fewer additional network nodes. For instance, signals or data packets received at relay node 130 have to traverse backhaul interface 136 and access node 120 (i.e. the donor access node for relay node 130), thereby adding additional latency that may be undesirable for certain types of applications. Thus, in making a handover decision based on target access node identifier, a macrocell access node 120 may be a preferred target, even though the signal measurement of the small access node 130 is greater. Thus, the type or latency of the target access node is weighted higher than the signal measurement for the determination of a preferred target access node.

Target access nodes may be assigned priorities based on their type, latency, and signal measurements, and highest-prioritized target access nodes may be preferred as handover targets. In some embodiments, the signal measurement of a high-latency access node, such as relay node 130, is completely disregarded unless it exceeds a threshold amount. For instance, if an RSRP or RSRQ of signal 135 of relay node 130 is a threshold amount greater than the corresponding RSRP/RSRQ of a signal 125 of macro access node 120, then relay node 130 may be considered as a preferred target, or assigned a higher priority. Additional factors may be used to determine the priority of a target access node. For example, an application type running on end-user wireless device 150 may be considered during the handover decision at access node 110. If the application type corresponds to a latency-sensitive application such as VoIP or gaming, then access node 120, which has a lower latency, is automatically assigned a higher priority, or designated as a preferred access node if the measurement of signal 135 is less than the aforementioned threshold. Further, a mobility or handover frequency of end-user wireless device 150 may affect the target access node prioritization. If end-user wireless device 150 has a high mobility, i.e. frequent handovers over a short time period, or short connections with serving access nodes such as access node 110, then access node 120 may be the preferred target, simply based on its longer range 121 that may prevent unnecessary additional handovers.

In an embodiment, the latency of a relay node such as relay node 130 can be based on a configuration of the relay node from among one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 120 are amplified and transmitted respectively by relay node 130 to wireless device 150.

Likewise, RF signals received from wireless device 150 are amplified and transmitted by relay node 130 respectively to donor access node 120. Alternatively or in addition, a layer 2 relay device performs a decode and forward (DF) function. RF signals received from donor access node 120 are demodulated and decoded, then encoded and modulated again before being transmitted by relay node 130 to wireless device 150. Likewise, RF signals received from wireless device 150 are demodulated and decoded, then encoded and modulated again before being transmitted by relay node 130 to donor access node 120. Alternatively or in addition, a layer 3 relay device also performs a decode and forward function. However, a layer 3 relay device also performs additional processing (such as ciphering and/or data concatenation/segmentation/resassembly). In other words, relay node 130 performs demodulation and decoding of the received RF signals (either uplink or downlink), processes received data, then encodes, modulates, and transmits the data to wireless device 150.

Wireless devices 150, 151 may be any device, system, combination of devices, or other such communication platform capable of communicating wirelessly with relay node 130 or access nodes 110, 120 using one or more frequency bands deployed therefrom. Wireless devices 150, 151 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120 or relay node 130. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 151, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics such as latencies, identities, etc. that may be shared with access nodes 110, 120, 130, via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 and relay node 130 can be any network node configured to provide communication between wireless devices 150, 151 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty five kilometers and an output power in the tens of watts. Relay node 130 can be a small access node including a microcell access node, a picocell access node, a femtocell access node, or the like such as a home NodeB or a home eNodeB device. Moreover, it is noted that while access nodes 110, 120 and relay node 130 are illustrated in FIG. 1, any number of access nodes and relay nodes can be implemented within system 100.

Access nodes 110, 120 and relay node 130 can comprise a processor and associated circuitry to execute or direct the execution of computer-readable instructions to obtain information as further described with reference to FIG. 2. Briefly, access nodes 110, 120 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 and relay node 130 can receive instructions and other input at a user interface. Access nodes 110, 120 communicate with gateway node 102 and controller node 104 via communication links 106, 107. Access nodes 110, 120, may communicate with each other using a direct link (not shown) such as an X2 link or similar.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
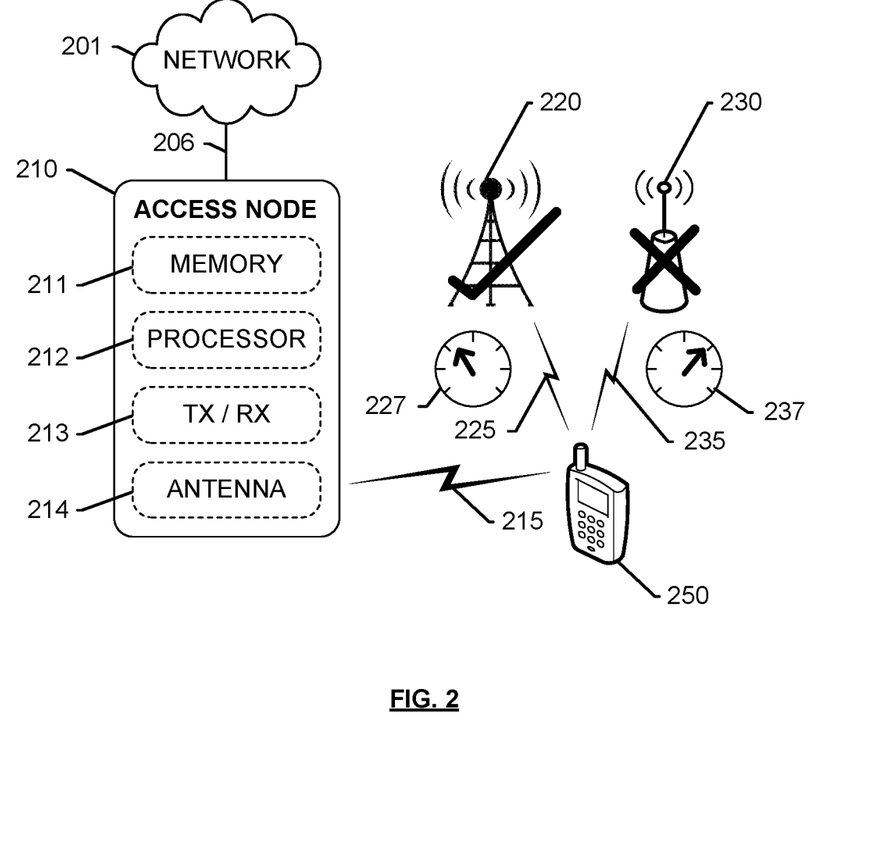
FIG. 2 depicts an exemplary donor access node.

FIG. 2 depicts an exemplary access node 210 for performing handovers. Access node 210 may be a macro-cell access node as described above, or simply "macro" or a small-cell access node, such as a relay node, or simply "relay." Access node 210 is configured as an access point for providing network services from network 201 directly to end-user wireless device 250. Access node 210 is illustrated as comprising a memory 211 for storing logical modules including handover determination operations described herein, a processor 212 for executing the logical modules, a transceiver 213, and an antenna 214 for communication with wireless device 250. Further, access node 210 is communicatively coupled to network 201 via communication interface 206, which may include additional components connected via any wired or wireless link as described above. For instance, if access node 210 is a macro, then there may be gateways and/or controllers in a path of communication interface 206. If access node 210 is a relay, then there may be additional access nodes in path 206. Moreover, although only one transceiver and antenna combination is depicted in access node 210, additional transceivers and antennas may be incorporated in order to deploy multiple frequency bands and to facilitate communication across other network nodes that are not shown, such as gateways, controllers, and other access nodes.

In operations described herein, access node 210 receives a handover request from end-user wireless device over communication link 215. The handover request may include measurements 227, 237 corresponding to signals 225, 235 that are respectively generated by access node 220 or relay node 230. As shown in this embodiment, access node 210 determines that access node 220 is the preferred target for a handover, even though a signal level 237 of signal 235 appears stronger than signal level 227 of signal 225. This determination is therefore weighted towards a latency of access nodes 220, 230, rather than the signal strengths 227, 237 thereof. In other words, a low-latency access node such as macro access node 220 is preferred, based on one or more of a low-latency requirement of an application running on end-user wireless device 250, or a mobility of end-user wireless device 250. Further, signal level 237 may be within a threshold amount higher than signal level 227, resulting in a determination at access node 210 to discard the signal measurements during a target access node determination. In some embodiments, a signal level of signal 215 may also be considered. For instance, if signal level 215 is strong, and if access node 210 is a relay node, then the handover is performed with access node 220 as the preferred target access node. Alternatively, if signal level of signal 215 is weaker than signal level 237 but stronger than signal level 227, and if access node 210 is a macro access node, then the handover may not be performed at all, as the application's latency requirement is satisfied by the serving access node 210.

Figure 3:
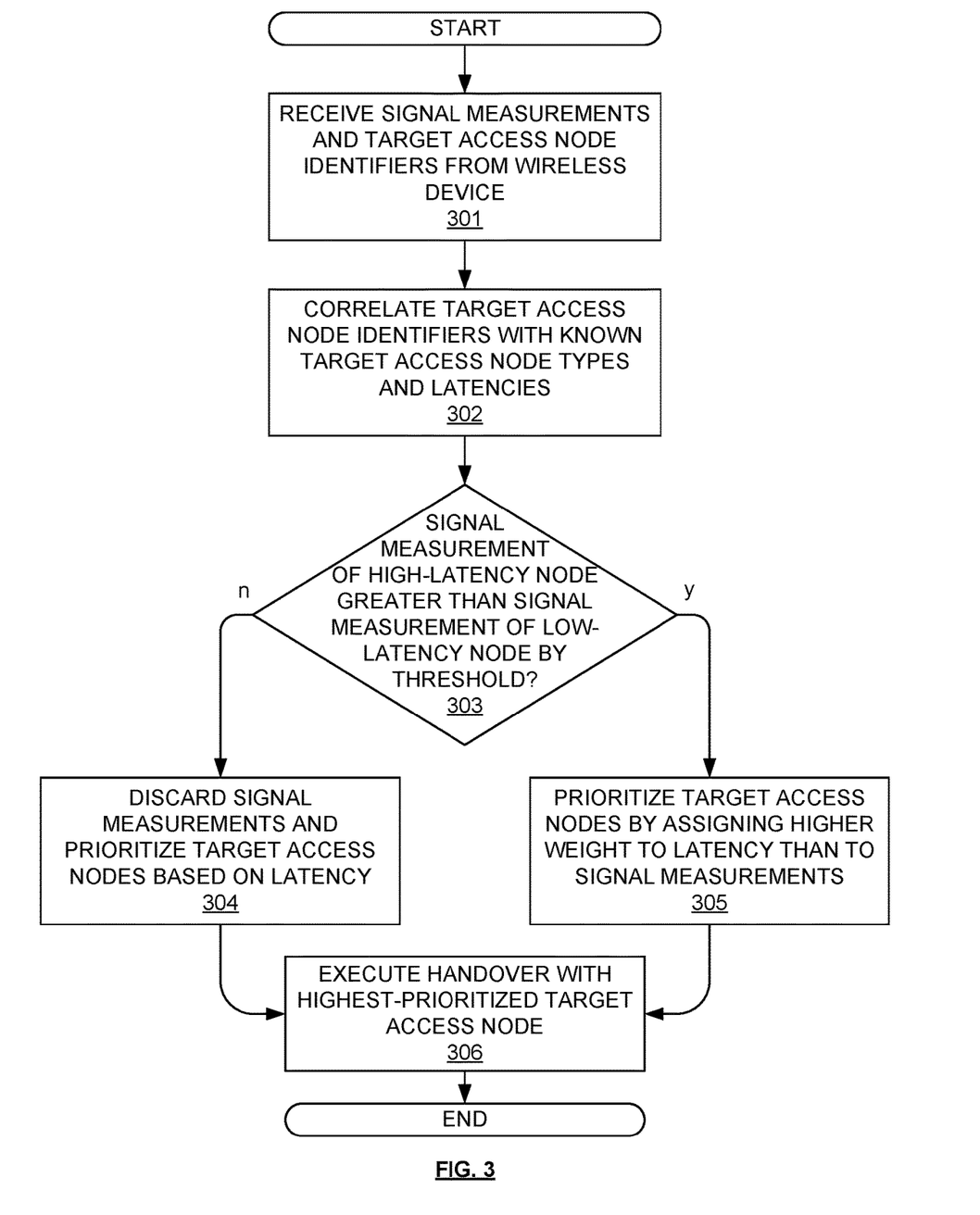
FIG. 3 depicts an exemplary method for performing handovers.

FIG. 3 depicts an exemplary method for performing handovers. The method of FIG. 3 is illustrated with respect to any network node such as a currently-serving access node or relay node. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 301, upon receiving signal measurements and target access node identifiers from a wireless device attempting to initiate a handover. For example, an end-user wireless device may determine that, based on signal measurements of reference signals measured at the end-user wireless device, a handover is required to sustain a quality of service. In other embodiments, the handover initiation may be triggered by any other factor. In either case, a first handover condition based on signal measurements may be satisfied, signal measurements of potential target access nodes received in 301. The signal measurements can further include an identifier of each target access node, enabling a correlation 302 of the target access node identifiers with a type and latency of each target access node. The identifier can include a unique physical cell identifier (PCI) of each target access node. The identifier of the target access node may further include (or may be associated with) an access node type, such as a macrocell access node, a small access node, a relay access node, etc. The identifier of the target access node may be associated with the access node type based on, for example, a comparison with a locally-stored table or accessible via a network.

In either case, at 303, the signal measurement of any high-latency access node is subject to a threshold comparison in order to determine whether or not the high-latency access node should be considered as a potential target access node. The threshold may include, for instance, a percentage of the current serving access node signal, or a percentage of the low-latency access node signal level. The threshold may be configurable based on a requirement of the application running on the end-user wireless device. For instance, a certain VoIP application may prefer a significantly high throughput or bandwidth rather than a moderately better latency. Such a preference may be identified by the application, or known to the network node performing the determination operations. If the signal level does not meet or exceed the threshold, at 304, the signal measurements are discarded, and target access nodes may be prioritized based solely on a latency or type of access node, wherein the type is associated with a known latency for each type. On the other hand, if the signal level meets or exceeds the threshold in 303, then at 305, access nodes are prioritized using both factors: signal level, and latency. In this embodiment, latency continues to have a higher weight in the determination of a preferred access node, particularly if the application requirement is that of a low latency. For instance, VoIP data packets and other real-time applications may prefer to not have to traverse additional network elements that add additional latency. Thus, the type or latency of the target access node is weighted higher than the signal measurement for the determination of a preferred target access node at 305. Subsequently, at 306, a handover is executed with the selected target access node using known methods.

Additional factors may be used to trigger the operations described in the method of FIG. 3. For example, the method may be initiated when an application type running on the end-user wireless device corresponds to a latency-sensitive application such as VoIP or gaming, in addition to any initial handover criteria being satisfied. Alternatively or in addition, a mobility or handover frequency of the end-user wireless device may reach a threshold mobility/handover frequency in order to trigger the method of FIG. 3.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, 210, relay node 130, wireless devices 150, 151, 250, and/or network 101.

Figure 4:
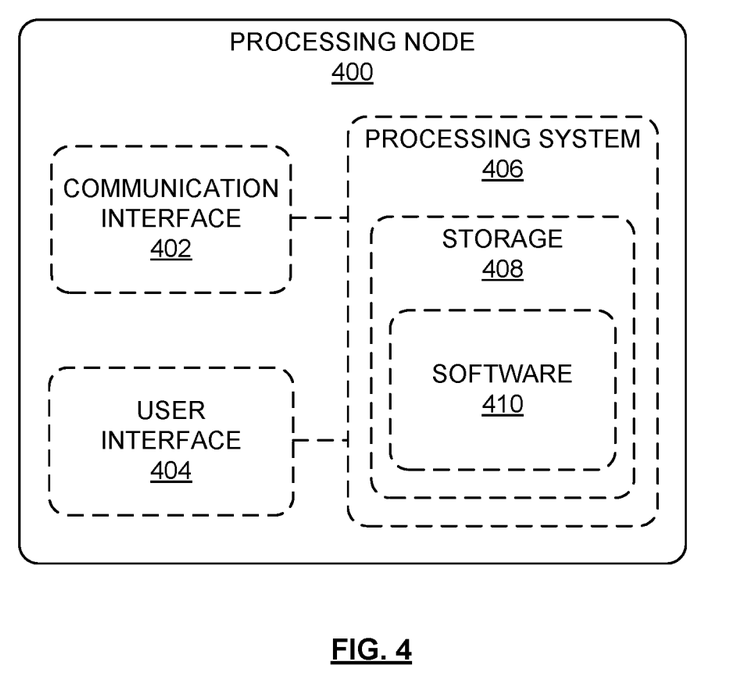
FIG. 4 depicts an exemplary processing node.

FIG. 4 depicts an exemplary processing node 400 comprising a communication interface 402, user interface 404, and processing system 406 in communication with communication interface 402 and user interface 404. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. For example, storage 408 may include a buffer. Software 410 may include computer programs, firmware, or some other form of machine-readable instructions, including an operating system, utilities, drivers, network interfaces, applications, or some other type of software. For example, software 410 may include a scheduling module. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing handovers, the method comprising:
  receiving, at a serving access node, one or more signal measurements from an end-user wireless device, the one or more signal measurements including an identifier for each target access node of one or more target access nodes associated with the one or more signal measurements;
  correlating the identifier of each target access node with a latency of said each target access node;
  determining, by the serving access node, a priority for said each target access node based in part on the latency and a signal measurement of said each target access node, wherein determining the priority further comprises:
for target access nodes with a signal measurement that does not exceed a threshold, discarding the signal measurement and determining the priority based solely on the latency; and
for target access nodes with a signal measurement that meets the threshold, determining the priority based on the signal measurement and the latency.

2. The method of claim 1, wherein a lower latency results in a higher priority.

3. The method of claim 2, wherein correlating the identifier with the latency further comprises correlating the identifier with a type of access node, the type being associated with the latency.

4. The method of claim 3, wherein the type is one of a macro access node type or a small access node type, and wherein a macro access node type is associated with a lower latency than a small access node type.

5. The method of claim 1, wherein determining the signal measurement of said each target access node comprises a signal strength of said each target access node.

6. The method of claim 5, wherein a first target access node having a first signal strength that is a threshold amount greater than a serving signal strength is assigned a higher priority than a second target access node having a second signal strength that is less than a threshold amount greater than the serving signal strength.

7. The method of claim 1, wherein determining the priority is further based on a mobility of the end-user wireless device.

8. The method of claim 7, wherein upon the end-user wireless device having a high mobility, a first access node with a lower latency is determined to have a higher priority than a second access node with a higher latency.

9. The method of claim 7, wherein the mobility of the end-user wireless device is based on a time period between handovers of the end-user wireless device.

10. The method of claim 1, wherein determining the priority is further based on a latency requirement of an application running on the end-user wireless device.

11. A system for performing handovers, the system comprising:
a first access node for providing network services to an end-user wireless device; and
a processor communicatively coupled to the first access node, the processor for configuring the access node to execute operations comprising:
receiving, at the first access node, one or more signal measurements from the end-user wireless device, the one or more signal measurements including an identifier for each access node of one or more target access nodes associated with the one or more signal measurements;
correlating the identifier of each target access node with a latency of said each target access node; and
determining, by the first access node based on the latency and the signal measurements, a priority for each target access node wherein determining the priority further comprises:
for target access nodes with a signal measurement that does not exceed a threshold, discarding the signal measurement and determining the priority based solely on the latency; and
for target access nodes with a signal measurement that meets the threshold, determining the priority based on the signal measurement and the latency.

12. The system of claim 11, wherein the identifier of said each target access node comprises a physical cell identifier (PCI) of said each target access node.

13. The system of claim 12, wherein the PCI is correlated with a table of known target access nodes stored on a memory of the first access node.

14. The system of claim 13, wherein the table is populated with one or more of a type or a latency of each of said known target access nodes.

15. The system of claim 11, wherein the end-user wireless device has a high mobility.

16. The system of claim 15, wherein the high mobility is determined based on a frequency of handovers of the end-user wireless device over a fixed time period.

17. A processing node for performing handovers, the processing node comprising a processor for enabling the processing node to perform operations comprising:
receiving, at a serving access node, a signal measurement and an identifier of one or more target access nodes from an end-user wireless device attempting a handover, the signal measurement being measured at the end-user wireless device;
correlating the identifier of each target access node with a latency of said each target access node; and
determining, by the serving access node, a priority for said each target access node based in part on the latency and a signal measurement of said each target access node, wherein determining the priority further comprises:
for target access nodes with a signal measurement that does not exceed a threshold, discarding the signal measurement and determining the priority based solely on the latency; and
for target access nodes with a signal measurement that meets the threshold, determining the priority based on the signal measurement and the latency.

18. The processing node of claim 17, wherein the signal measurement is based on one or both of a reference signal receive power (RSRP) or a reference signal receive quality (RSRQ).

19. The processing node of claim 17, wherein the identifier of the target access node indicates that the target access node is a macro access node, the macro access node being associated with a low latency.

* * * * *